(12) United States Patent
Haase

(10) Patent No.: US 6,882,132 B2
(45) Date of Patent: Apr. 19, 2005

(54) DC VOLTAGE CHOPPER FOR DC VOLTAGE

(75) Inventor: Ordwin Haase, Taufkirchen (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/696,368

(22) Filed: Oct. 29, 2003

(65) Prior Publication Data

US 2004/0145927 A1 Jul. 29, 2004

(30) Foreign Application Priority Data

Oct. 29, 2002 (DE) .......................... 102 50 359

(51) Int. Cl.$^7$ .............................................. G05F 1/56
(52) U.S. Cl. ..................................................... 323/283
(58) Field of Search ............................... 323/282, 283, 323/285

(56) References Cited

U.S. PATENT DOCUMENTS

| | | | | |
|---|---|---|---|---|
| 4,989,116 A | * | 1/1991 | Gruner et al. | 361/154 |
| 5,138,250 A | * | 8/1992 | Capel | 323/283 |
| 5,838,147 A | * | 11/1998 | Suzuki et al. | 323/289 |
| 6,259,236 B1 | * | 7/2001 | Higuchi | 323/222 |
| 6,522,115 B1 | | 2/2003 | Greitschus | |

FOREIGN PATENT DOCUMENTS

| | | |
|---|---|---|
| DE | 696 08 638 T2 | 4/1997 |
| DE | 198 37 153 A1 | 3/2000 |
| EP | 0 759 653 A2 | 2/1997 |
| EP | 0 769 844 B1 | 4/1997 |
| FR | 2 343 358 | 9/1977 |

* cited by examiner

*Primary Examiner*—Adolf Berhane
(74) *Attorney, Agent, or Firm*—Laurence A. Greenberg; Werner H. Stemer; Ralph E. Locher

(57) ABSTRACT

A DC voltage chopper contains a power switch device with a drive circuit, an LC filter circuit connected in a main circuit of the power switch device, a commutating circuit connected in parallel to the LC filter circuit, and a comparison circuit with a hysteretic function and has an output connected to the drive circuit. A first input terminal of the comparison circuit is connected to an output terminal of the DC voltage chopper, and a second input terminal of the comparison circuit is connected to a reference voltage generator that generates a reference voltage. The drive circuit has a logic circuit with a first input receiving the output signal of the comparison signal of the comparison circuit, and a second input receiving a trigger clock signal with a fixed frequency. The DC voltage chopper combines the good attributes of hysteresis control with a fixed switching frequency.

18 Claims, 6 Drawing Sheets

DC VOLTAGE CHOPPER FOR DC VOLTAGE

BACKGROUND OF THE INVENTION

Field of the Invention

The invention relates to a DC voltage chopper (i.e. a switching regulator) that contains a power switch device having a drive circuit, an LC filter circuit connected in the main circuit of the power switch device and has an output terminal of the DC voltage chopper, a commutating circuit connected in parallel to the LC filter circuit, and a comparison circuit having a hysteretic function and an output connected to the drive circuit of the power switch device. A first input terminal of the comparison circuit is connected to the output terminal of the DC voltage chopper. A second input terminal of the comparison circuit is connected to a reference voltage generator that prescribes a reference voltage of the DC voltage chopper.

The correction of various loads, the maintenance of a desired input voltage/output voltage ratio, and the maintenance of stability are features of a chopper that fundamentally conflict and must therefore be solved by different concepts.

A first concept is in the voltage mode regulator. Its advantages are the possibility of a continuous current mode given an optimal utilization of the external components, a fixed switching frequency which simplifies the dimensioning of the external filters, a very good static load compensation based on integrator behavior, and the possibility of a small sampling ratio. The disadvantages of the voltage mode regulator are moderate dynamic characteristics, an expensive compensation, and the omission of a current limitation.

An alternative is the current mode regulator, whose advantages include the possibility of a continuous current mode in which the output current of the regulator always remains above zero, a fixed switching frequency, good dynamic characteristics, the elimination of the need for compensation, and the system-conditioned current limitation. The disadvantages of the current mode regulator are poor static load correction, and the fact that a small sampling ratio is only realizable for a larger circuit expenditure and with poorer characteristics.

A further alternative chopper is what is known as a discontinuous current mode (DCM) regulator. Its advantage is that it does not have any stability problems at all, and its disadvantages are the low switching frequency and the varying thereof.

A fourth possibility for realizing a chopper is a hysteretic voltage mode regulator. The advantages of the regulator are that it makes possible a small sampling ratio and has the best static and dynamic characteristics. Its disadvantages are its variable frequency, which depends on external parameters, and the omission of a current limitation.

SUMMARY OF THE INVENTION

It is accordingly an object of the invention to provide a DC voltage chopper for a DC voltage that overcomes the above-mentioned disadvantages of the prior art devices of this general type, which exploits the good characteristics of a hysteretic voltage mode regulator while eliminating its disadvantages.

With the foregoing and other objects in view there is provided, in accordance with the invention, a DC voltage chopper. The DC voltage chopper contains a power switch device having a drive circuit and a main circuit connected to and driven by the drive circuit. An LC filter circuit is connected to the main circuit. The LC filter circuit has an output terminal functioning as an output terminal of the DC voltage chopper. A commutating circuit is connected in parallel to the LC filter circuit. A reference voltage generator is provided and outputs a reference voltage. A comparison circuit having a hysteretic function and an output is coupled to the drive circuit. The comparison circuit has a first input terminal connected to the output terminal of the DC voltage chopper and a second input terminal connected to the reference voltage generator and receives the reference voltage. The drive circuit contains a logic circuit having a first input connected to the output of the comparison circuit for receiving a switch-off signal for the power switch device and a second input for receiving a switch-on signal for the power switch device. The second input receives a trigger clock signal with a fixed frequency as the switch-on signal. The logic circuit generates an output signal for switching the power switch device on after a constant period of time being determined by the fixed frequency of the trigger clock signal. The logic circuit switches the power switch device off as soon as an output voltage of the DC voltage chopper reaches the reference voltage.

It is thus the object of the invention to make available a DC voltage chopper that combines a large input voltage/output voltage ratio with the best stability characteristics given minimal output capacities, a large load correction, and a broad load current range given a fixed switching frequency.

Accordingly, in the inventive DC voltage chopper, the lower switch-on threshold is replaced by a frequency triggering that is independent of thresholds. From the outside, the frequency looks like a variable switch-on threshold. The frequency of the inventive DC voltage chopper is thus fixed, while the advantages of a hysteretic regulator are nevertheless gained. The advantages include short transient times given load change, the greatest possible load correction, and low system current consumption, because only a few simple components need to be supplied internally.

The switch-off condition remains the same as in a conventional hysteretic DC voltage chopper, namely a voltage limit value at the output of the power switch regulator.

The inventive DC voltage chopper can be advantageously constructed in such a way that the switch-on condition is blocked by the upper threshold. Therefore, the switching on does not occur as long as the voltage does not fall below the upper threshold. This makes possible smaller frequencies than the internal ones.

According to a preferred exemplifying embodiment, the DC voltage chopper contains a current detecting circuit in the main circuit of the power switch device for the purpose of detecting a maximum current intensity flowing through the power switch device. The logic circuit has an OR-gate for gating the switch-off condition that is derived from the output voltage and the detected maximum current intensity. The current detecting circuit serves as an additional switch-off criterion and thus limits the current through the coils. This addition also makes possible a current-limited run-up.

Owing to the integrating character of the load capacitance, this type of DC voltage chopper can become unstable when the equivalent series resistance (ESR) becomes very small, i.e. when the load capacitance is actually dominant. The equivalent series resistance is composed of the ohmic portions of the power switch device and the LC filter circuit. Stabilization is possible when the reference voltage generator is connected to a circuit that generates a ramp voltage and that varies the reference voltage being fed to the second input terminal of the comparison circuit periodically with the ramp voltage, as in a preferred exemplifying embodiment of the invention. By these measures, the DC voltage chopper is supplied not with a constant reference voltage but rather with a reference voltage that is variable due to the ramp signal.

The circuit that generates the ramp voltage is triggered by a trigger clock signal, and consequently the generated ramp signal has the same frequency as the trigger clock signal. A linear ramp stabilizes the DC voltage chopper appreciably. The ESR is internally simulated by use of the ramp. Even better characteristics are exhibited by a non-linear ramp such as a progressively sloping ramp like a quadratic or exponential ramp, or a linearly approximated progressively sloping ramp. The progressively sloping ramp forces the switch to close.

The inventive DC voltage chopper is further developed by the provision of an overvoltage protection circuit that detects an excessive output voltage at the output terminal of the DC voltage chopper, which has a second comparison circuit that exhibits hysteretic behavior, whose first input terminal is connected to the output terminal of the DC voltage chopper, whose second input terminal is connected to an overvoltage reference signal, and whose output signal is supplied as an additional switch-off condition in the OR gate of the logic circuit, where it is OR linked with the first switch-off condition which is derived from the detected maximum current intensity.

This type of overvoltage protection circuit that prevents overvoltage at the output can advantageously also be combined with the current detection circuit that prevents overcurrent at the output. The overvoltage reference signal for the overvoltage protection circuit can advantageously be formed of a reference voltage that is offset relative to the reference DC voltage by an offset voltage.

In a further exemplifying embodiment, the inventive DC voltage chopper is configured to perform the hysteretic regulation only in the discontinuous current mode and to operate as a current mode regulator in the continuous current mode. In this exemplifying embodiment of the DC voltage chopper, it is not necessary to compensate for a small ESR.

A timing element can be connected downstream from the logic circuit, which element leaves the power switch device on for a short time regardless of whether a switch-off condition is detected at this time.

Other features which are considered as characteristic for the invention are set forth in the appended claims.

Although the invention is illustrated and described herein as embodied in a DC voltage chopper for a DC voltage, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
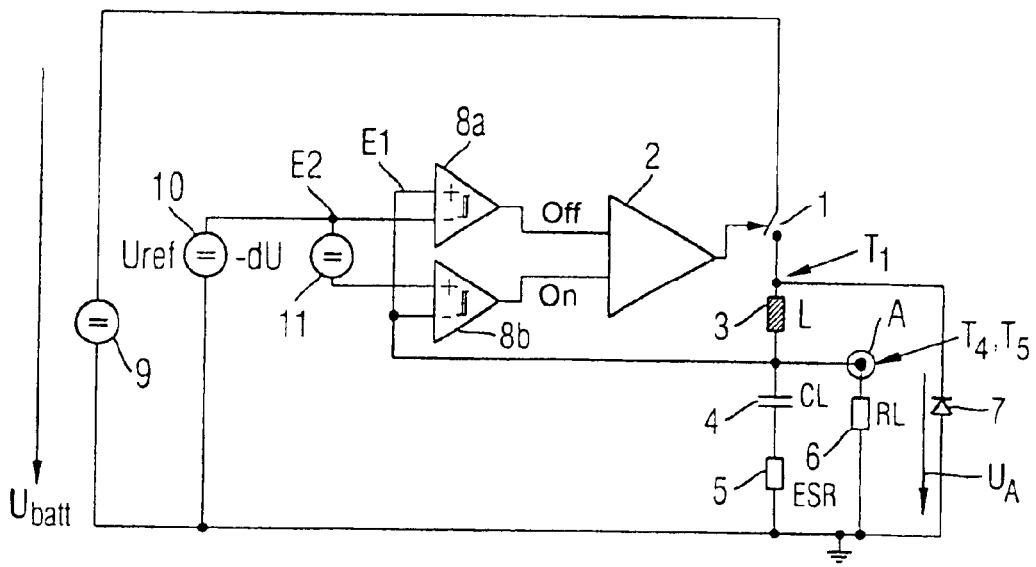
FIG. 1 is a circuit diagram of an example of a known DC voltage chopper with a hysteretic function which works like a downward regulator, for comparison purposes.

Referring now to the figures of the drawing in detail and first, particularly, to FIG. 1 thereof, there is shown an example of a hysteretic DC voltage chopper that works like a downward regulator according to the prior art.

FIG. 1 is a schematic representation of a wiring diagram of a hysteretic DC voltage chopper that works like a downward regulator, which is not embraced by the invention.

Disposed in a main circuit of a power switch device 1, schematically represented as a switch which is connected to a DC voltage source 9 of a voltage Ubatt, is an LC filter circuit formed of an inductance 3, a capacitance 4, and an equivalent series resistance (ESR) 5. A load 6, schematically represented as a load resistance RL, is connected in parallel to the capacitance 4 and the equivalent series resistance 5, and a commutating circuit, symbolized here by a single diode 7, is connected parallel to the LC filter circuit 3, 4, 5. The load 6 is pending at an output terminal A of the DC voltage chopper, and a regulated output voltage $U_A$ is outputted at the output terminal A. By a drive circuit 2, represented simply as an amplifier, an output signal that switches the power switch device 1 on and off is generated according to switch-on and switch-off conditions (signals) that are inputted at the two inputs of the drive circuit 2. The switch-on signal and the switch-off signal are generated by a hysteretic comparison circuit, which contains only two hysteretic comparison units 8a, 8b and two inputs E1, E2 for the sake of simplicity. The first input E1 of the comparison circuit receives the output voltage $U_A$ pending at the output A of the DC voltage chopper, whereas the second input E2 of the hysteretic comparison circuit 8a, 8b receives a reference voltage Uref. An offset element 11 forms an offset voltage –dU from the reference voltage Uref, as a result of which the switch-off signal "OFF" that is fed to one input of the drive circuit 2 is present when the output voltage $U_A$ at the output terminal A of the DC voltage chopper goes over an upper threshold that is set at the comparator 8a. Conversely, the switch-on signal "ON" that is fed to the second input of the drive circuit 2 for switching on the power switch device 1 is generated when the output voltage $U_A$ of the DC voltage chopper which is generated at the output terminal A falls below a lower threshold that is formed in the hysteretic comparator 8b by the offset voltage –dU that is derived from the reference voltage Uref.

Figure 2:
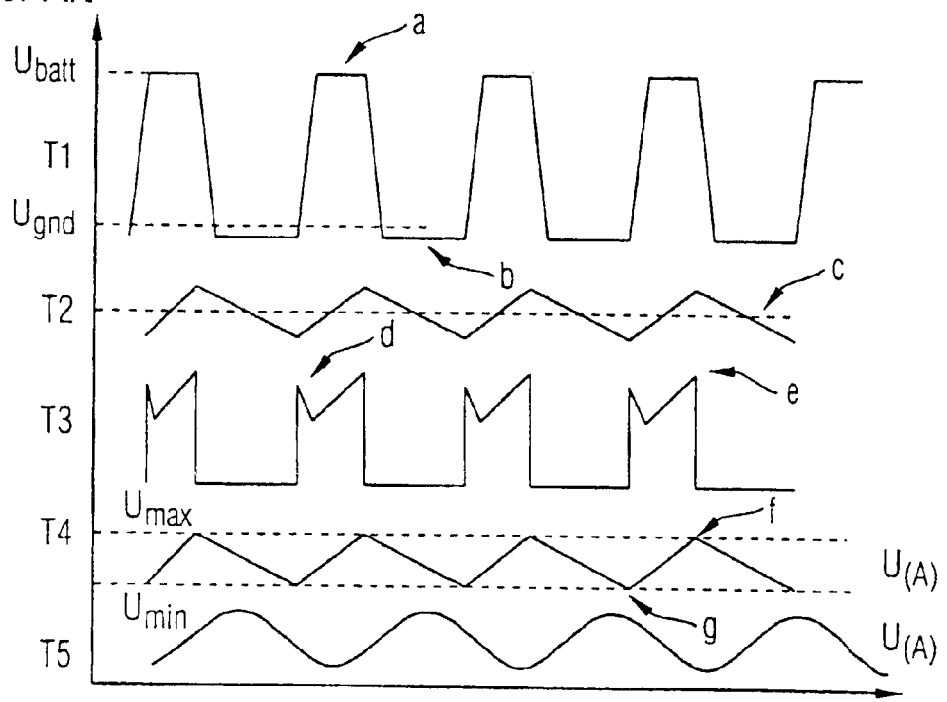
FIG. 2 is a signal timing diagram representing the function of the DC voltage chopper shown in FIG. 1.

FIG. 2 represents typical signal shapes that emerge in the DC voltage chopper represented in FIG. 1. The first line indicates the voltage curve at node T1 of the DC voltage chopper. The voltage which drops at T1 is limited in the upward direction (arrow a) by the DC voltage Ubatt and in the downward direction (arrow b) by the difference between the ground potential $U_{gnd}$ and the voltage of the diode 7. The signal shape T2 represents the current characteristic through the inductance 3 and, as a dotted line (arrow c), the average coil current. The third line T3 represents the current through the power switch 1 when the DC voltage chopper is working in the current mode. The two bottom lines T4 and T5 of FIG. 2 represent the curve of the output voltage $U_A$ at the output terminal A given a large ESR and a small ESR, respectively. The signal curve T4 in the second to last line of FIG. 2 shows that the DC voltage chopper represented in FIG. 1 switches back and forth between the voltage thresholds $U_{max}$ and $U_{min}$. The chopper switches on at arrow g and off at arrow f. The switching frequency is dependent on the equivalent series resistance ESR, particularly the ohmic portion of the utilized output capacitance 4, because the voltage over ESR, which is determined by the current through the coil multiplied by the value of the resistance ESR, is the controlled variable. The larger the resistance value ESR of the equivalent series resistance 5 is, the more quickly the hysteretic voltage is achieved, and the higher the switching frequency of the regulator is, this being proportional to the resistance value ESR.

On the other hand, if the resistance becomes very small (last arrow T5 in FIG. 2), the integral relation of the capacitance 4 itself still remains as the controlled variable. The frequency becomes very small until the regulator becomes unstable. There is an optimal hysteretic voltage for each external capacitance of the load 6 in the circuit of the DC voltage chopper represented in FIG. 1. Given extremely small series resistances of the load capacitance, an additional stabilization is needed. In order to eliminate the extreme dependency of the switching frequency of the DC voltage chopper represented in FIG. 1 on the value ESR of the equivalent series resistance 5, the regulating is performed directly on the current in what as known as the current mode hysteretic chopper. This eliminates the dependency on the equivalent series resistance 5. However, the dependency on the size of the coil 3 and its ESR persists.

It remains to be mentioned that the power switch device 1, represented in FIG. 1 as a simple switch, can be realized by any known power switch device, for instance using a DMOS switch, a bipolar switch, or such like.

The same applies to diode 7, which can also be realized internally as a switch.

Figure 3:
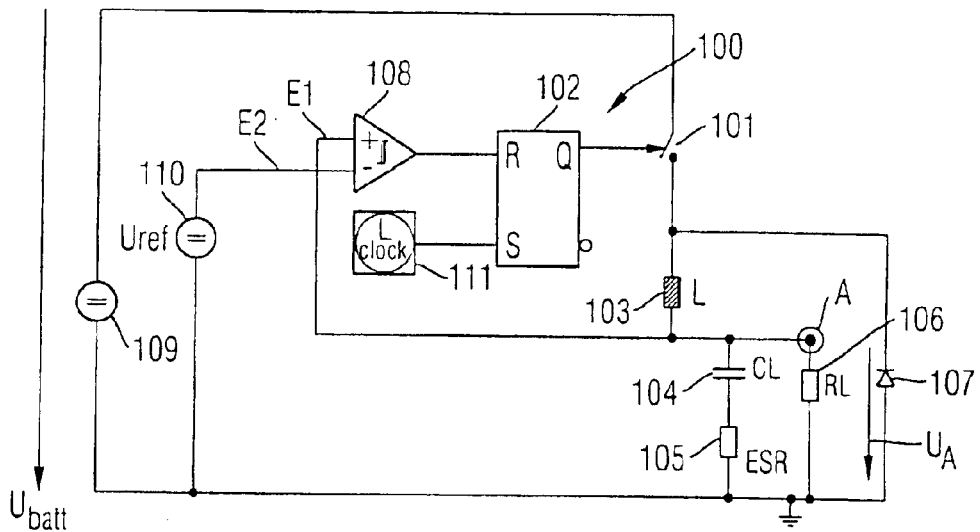
FIG. 3 is a circuit diagram of a first exemplifying embodiment of the invention.

FIG. 3 is a schematic representation of a wiring diagram of a first exemplifying embodiment of an inventive DC voltage chopper 100. The circuit configuration is identical to the DC voltage choppers described above in connection with FIGS. 1 and 2 up until the generating of the switch-on and switch-off signal. Accordingly, in the main circuit of the power switch device 101, which is supplied with the voltage Ubatt by an input voltage source 109, there is an LC filter circuit, which is represented in FIG. 3 by a series circuit formed of an inductance 103, a capacitance 104, and an equivalent series resistance (ESR) 105. The load resistance 106, and the commutating circuit is referenced with a diode 107. The output voltage $U_A$ is tapped at the output A of the inventive DC voltage chopper and inputted at a first input terminal E1 of a comparison circuit 108 with a hysteretic characteristic. At the second input terminal E2 of the comparison circuit 108 is the reference voltage Uref, which is symbolized by a voltage source 110. The drive circuit 102 is a logic circuit 102 in this case, having two inputs R, S and one output Q in FIG. 3, of which a first input R receives the output of the comparison circuit 108 for receiving the switch-off signal for the power switch device 101, and the second input S receives a trigger clock signal 111 with a fixed frequency, which delivers the switch-on signal of the power switch device 101.

Based on the fixed trigger clock signal 111, the output signal Q that is generated by the logic circuit 102 switches the power switch device 101 on after a defined time that is determined by the frequency of the trigger signal 111, and the logic circuit 102 switches off the power switch 101 that is connected to its output as soon as the output voltage $U_A$ of the DC voltage chopper 100 reaches the reference voltage Uref. From outside, the frequency of the trigger signal 111 looks like a variable switch-on threshold. Based on the fixed-frequency trigger clock signal 111, the frequency of the inventive DC voltage chopper is prescribed, while the advantages of a hysteretic regulator are nevertheless achieved. The advantages include short transient times given load changes, greatest possible load correction, and low system power consumption from the input voltage source 109, there being only a small number of simple components to supply internally.

In order also to be able to regulate when there are small loads, the switch-on signal can be blocked by the upper threshold ($U_{max}$ in FIG. 2). That is, the switch is not switched on as long as the voltage does not drop below the upper threshold.

Figure 4:
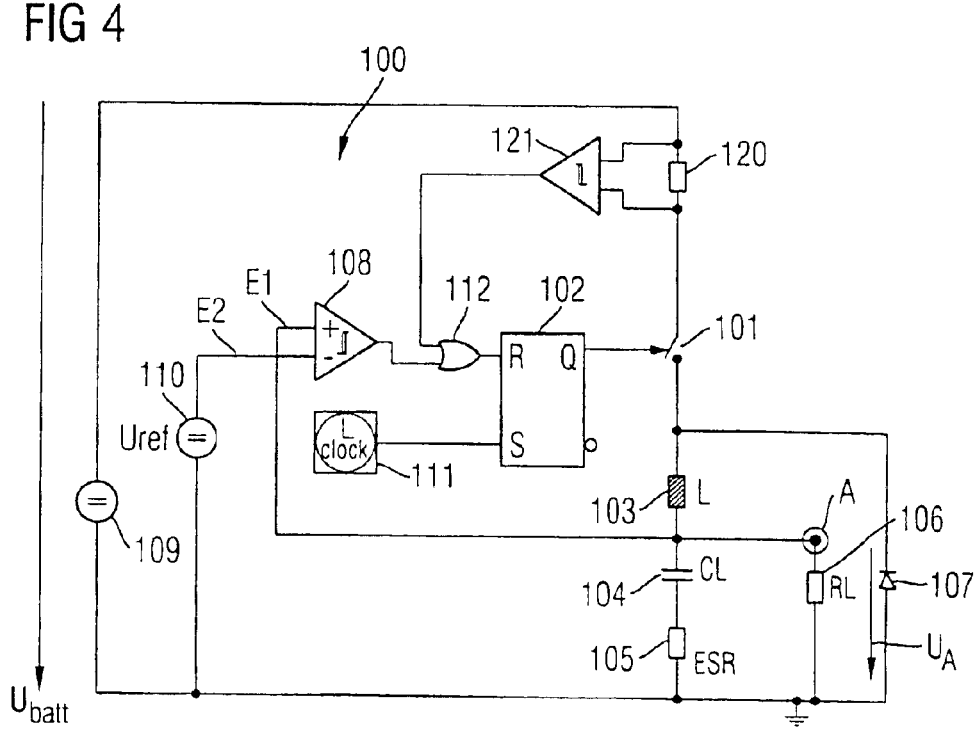
FIG. 4 is a circuit diagram of a second exemplifying embodiment of the invention with a current limiting device.

In a second exemplifying embodiment, represented schematically in FIG. 4, of the inventive power switch regulator, a current detecting circuit that is known per se is interposed, this being represented in the form of a measuring current resistance 120 in the main circuit of the power switch device 101 and a comparison circuit 121, whose output current, which indicates an overcurrent through the power switch device 101, is supplied to an input of an OR gate 112 of the logic circuit. The other input of the OR gate 112 receives the switch-off criterion from the hysteretic comparison circuit 108, and which OR-links these two switch-off signals or conditions. In all other wiring details, the exemplifying embodiment represented in FIG. 4 is identical to the above-described first exemplifying embodiment of the inventive DC voltage chopper 100 represented in FIG. 3. The second exemplifying embodiment represented in FIG. 4 thus makes it possible to limit the current intensity flowing through the power switch device 101 with the aid of the current detecting circuit 120, 121. Besides that, in principle this addition makes possible a current limited run-up of the DC voltage chopper 100.

Figure 5:
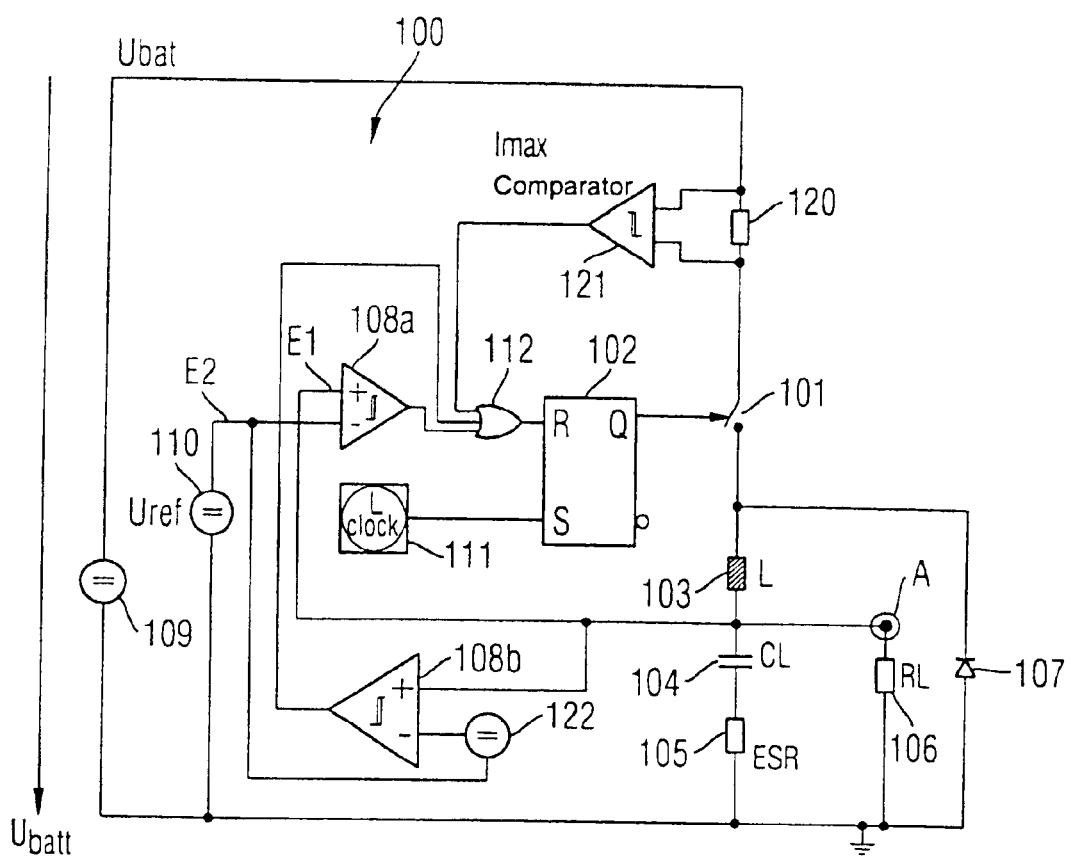
FIG. 5 is a circuit diagram of a third exemplifying embodiment of the invention that additionally contains an overvoltage protection circuit for current limiting.

A third exemplifying embodiment of an inventive DC voltage chopper 100 which is represented in FIG. 5 combines the above described current limiting by the current detecting circuit 120, 121 with an output voltage limitation and contains an overvoltage protection circuit 108b which detects an excess output voltage $U_A$ at the output terminal A of the DC voltage chopper 100. The overvoltage protection circuit has a second comparison circuit 108b containing a hysteretic behavior with two inputs and one output. One input terminal of the comparison circuit 108b receives the output voltage $U_A$ of the DC voltage chopper 100, and the other input of the second comparison circuit 108 receives a reference voltage 122 indicating an overvoltage condition. The output signal of the comparison circuit 108b indicating an overvoltage condition is applied as the third switch-off signal to an input of the OR gate 112, which has three inputs.

In all other details, the third exemplifying embodiment represented in FIG. 5 of the inventive DC voltage chopper 100 is identical to the inventive exemplifying embodiments described above in connection with FIGS. 3 and 4.

As mentioned above, the above-described inventive DC voltage chopper is unstable when the equivalent series resistance is very small or the load capacity is actually dominant, owing to the integral character of the load capacity.

Figure 6:
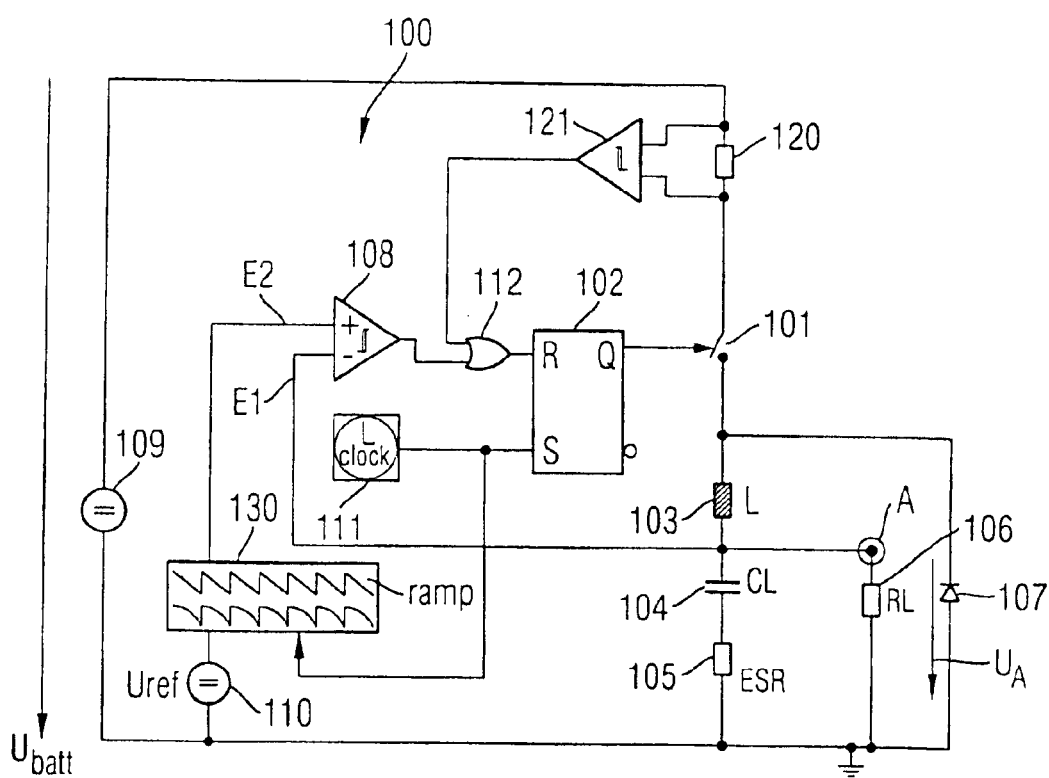
FIG. 6 is a circuit diagram of a fourth exemplifying embodiment of the invention with what is known as low ESR compensation.
Figure 7:
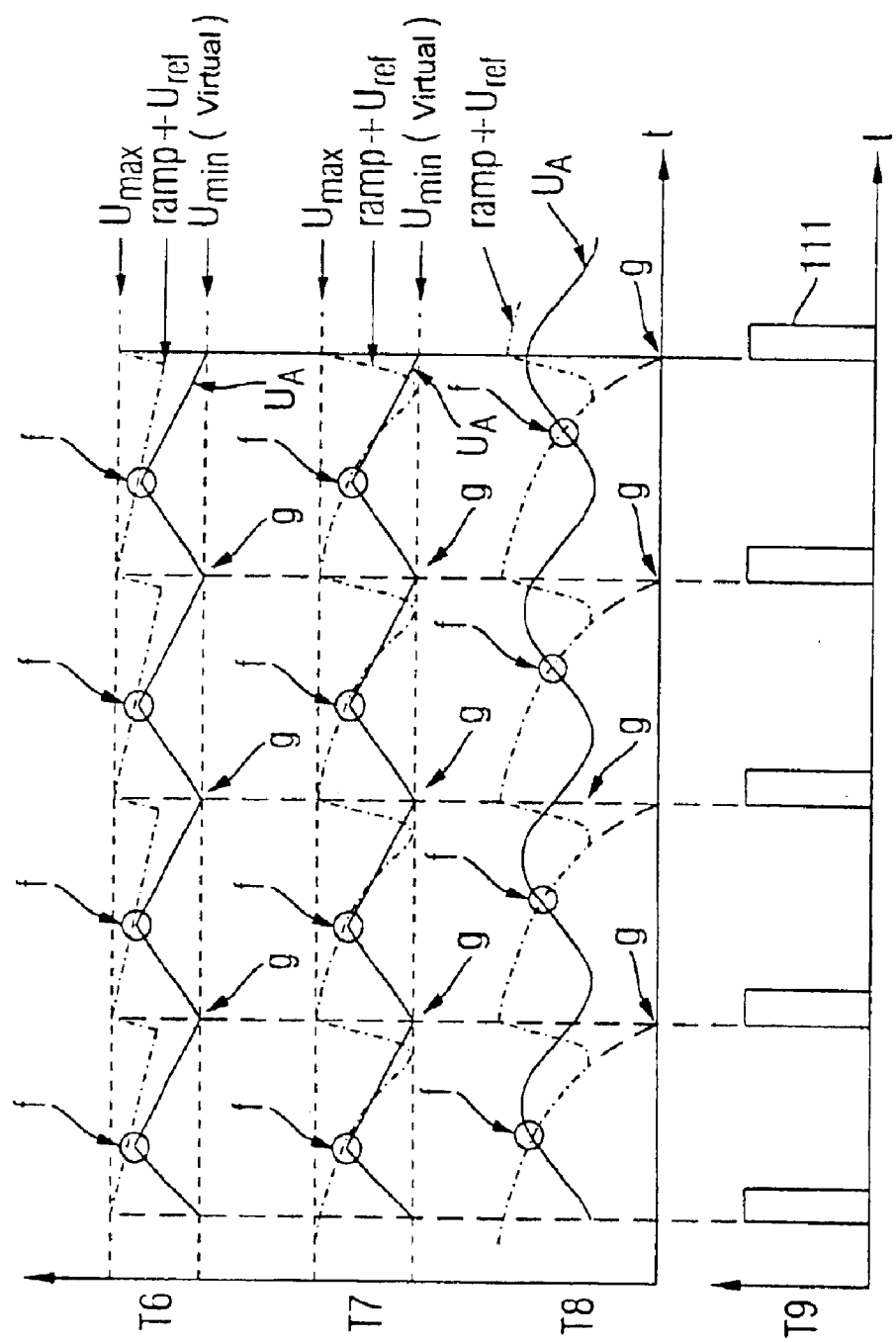
FIG. 7 is a signal timing diagram representing the function of the circuit shown in FIG. 6 of an inventive DC voltage chopper.

According to a fourth exemplifying embodiment represented in FIG. 6, the inventive DC voltage chopper 100 is stabilized by a ramp voltage that is superimposed on the reference voltage Uref by the reference voltage source 110. To that end, this exemplifying embodiment according to the circuit configuration represented in FIG. 6 contains a ramp voltage generator 130, whose ramp signal ramp is triggered by, i.e. generated synchronously with, the trigger signal 111. The ramp signal ramp can have a linear ramp, which already stabilizes the inventive DC voltage chopper 100 substantially. The signal timing diagrams T6–T9 represented in FIG. 7 represent various signals that emerge in the circuit configuration of the inventive DC voltage chopper 100 represented in FIG. 6, which are triggered and run synchronized with the trigger clock signal 111 that is contained in the last line of FIG. 7, referenced T9. The signal curve referenced T6 in the top line of FIG. 7 indicates the case of a linear ramp signal ramp. Upon being triggered by the trigger clock signal 111 (T9), the power switch device is always switched on at times g. It is switched off at times f, when the output voltage $U_A$ reaches the reference voltage upon which the ramp signal is superimposed. While the linear ramp signal ramp already stabilizes the DC voltage chopper 100 appreciably, a progressively sloping, for instance quadratically or exponentially sloping, ramp signal ramp, shows better stability. The progressively steeper slope over time forces the power switch device to switch off. These relations are represented in the signal curves referenced T7 and T8 in the second and third lines of FIG. 7, respectively. The ramp signal ramp of the signal curve T7 is quadratically sloping, and the ramp signal T8 is likewise progressively sloping, for instance exponentially. The signal curve T8 represents the case of a very small equivalent series resistance ESR. As in signal curve T6, in the signal curves T7 and T8 the points f represent the switch-off points, whereas the points g represent the switch-on points that are forced by the trigger clock signal 111.

Figure 8:
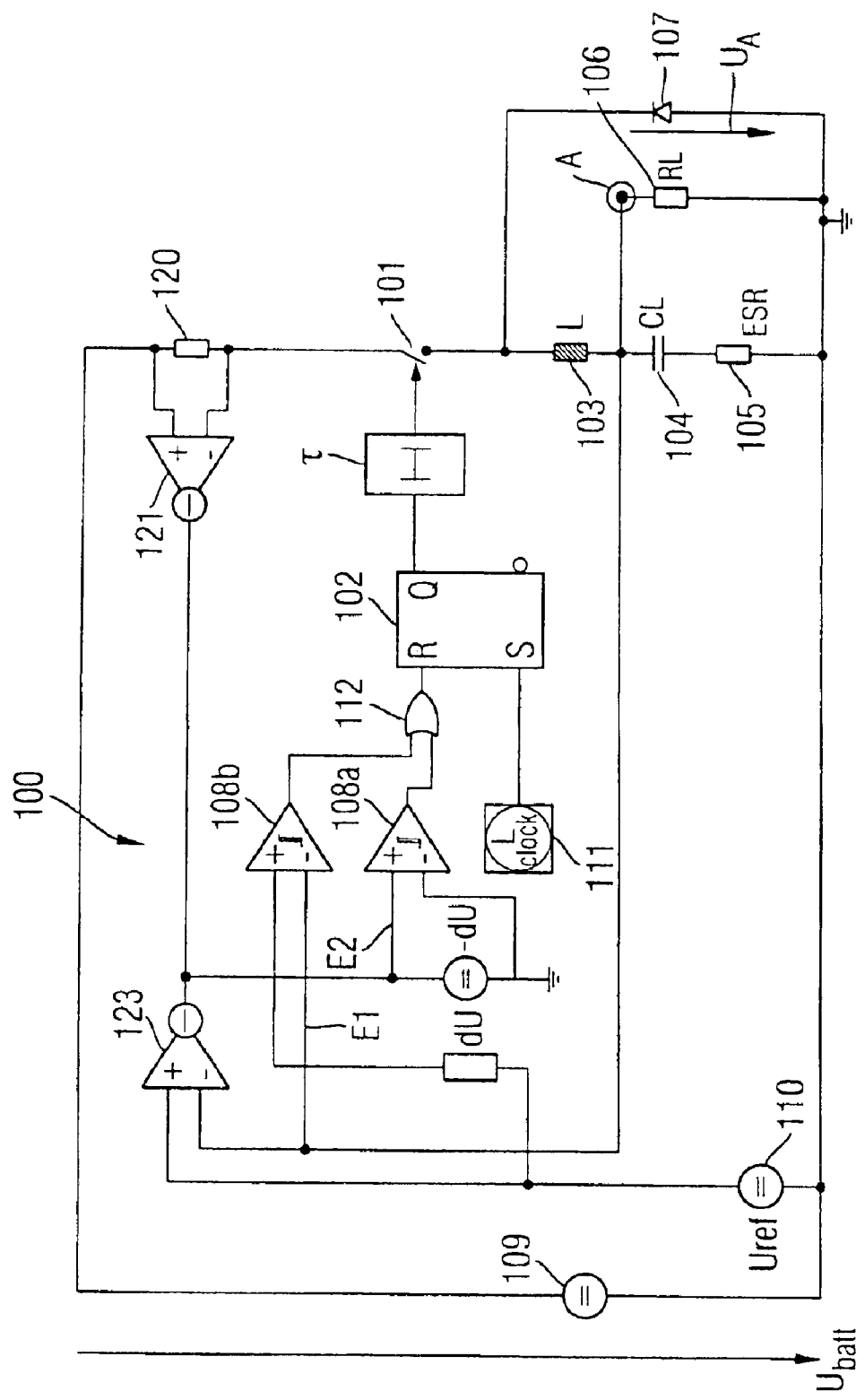
FIG. 8 is a circuit diagram of a fifth exemplifying embodiment of the invention, in which the hysteretic regulating works only in the discontinuous mode, whereas, in continuous current mode, regulating works as in the case of a known current mode chopper.

A fifth exemplifying embodiment of the inventive DC voltage chopper, represented in FIG. 8, is configured so that it works as a hysteretic regulator only in the discontinuous current mode, so that compensation for low ESR is not needed. In the continuous current mode, the inventive DC voltage chopper 100 represented in FIG. 8 works like a known current mode regulator. Given small coil currents, an error amplifier 123 and the comparator 121 that works as a voltage controlled current source are still very weakly driven. The current no longer suffices for driving the hysteretic comparator 108a. The output voltage $U_A$ of the DC voltage chopper 100 drifts slowly up until reaching the threshold of the overvoltage comparator 108b. The comparator provides for switching the power switch device 101 off. Thus, for small output currents, the same operation occurs as in FIG. 6.

A DC voltage chopper 100 according to FIG. 8 was realized as an integrated circuit for experimental purposes. This realization exhibits very good stability in a current range up to 1 ampere.

I claim:

1. A DC voltage chopper, comprising:
  a power switch device having a drive circuit and a main circuit connected to and driven by said drive circuit;
  an LC filter circuit connected to said main circuit, said LC filter circuit having an output terminal functioning as an output terminal of the DC voltage chopper;
  a commutating circuit connected in parallel to said LC filter circuit;
  a reference voltage generator outputting a reference voltage; and
  a comparison circuit having a hysteretic function and an output coupled to said drive circuit, said comparison circuit having a first input terminal connected to said output terminal of the DC voltage chopper and a second input terminal connected to said reference voltage generator and receiving the reference voltage;
  said drive circuit containing a logic circuit having a first input connected to said output of said comparison circuit for receiving a switch-off signal for said power switch device and a second input for receiving a switch-on signal for said power switch device, said second input receiving a trigger clock signal with a fixed frequency as the switch-on signal, said logic circuit generating an output signal for switching said power switch device on after a constant period of time being determined by the fixed frequency of the trigger clock signal, said logic circuit switching said power switch device off as soon as an output voltage of the DC voltage chopper reaches the reference voltage.

2. The DC voltage chopper according to claim 1, further comprising a current detecting circuit for detecting a maximum current intensity flowing through said power switch device and connected to said main circuit, said logic circuit having an OR gate for OR-linking switch-off signals derived from the output voltage and from the maximum current intensity detected.

3. The DC voltage chopper according to claim 1, further comprising a ramp circuit connected to said reference voltage generator and generating a ramp signal, said ramp circuit varying the reference voltage supplied to said second input terminal of said comparison circuit periodically with the ramp signal.

4. The DC voltage chopper according to claim 3, wherein said ramp circuit receives the trigger clock signal, and the ramp signal is triggered by the trigger clock signal.

5. The DC voltage chopper according to claim 3, wherein the ramp signal is a sloping ramp signal.

6. The DC voltage chopper according to claim 5, wherein the ramp signal has a ramp sloping linearly.

7. The DC voltage chopper according to claim 5, wherein the ramp signal slopes non-linearly.

8. The DC voltage chopper according to claim 3, wherein the ramp signal has a quadratically sloping ramp.

9. The DC voltage chopper according to claim 2, further comprising:
  an overvoltage protection circuit for detecting an excess output voltage at said output terminal of the DC voltage chopper, said overvoltage protection circuit containing a further comparison circuit exhibiting hysteretic behavior and having a first input terminal connected to said output terminal, and a second input terminal receiving an overvoltage reference signal, said further comparison circuit outputting an output signal supplied to said OR gate of said logic circuit as an additional switch-off signal where it is OR-linked with the switch-off signal derived from the maximum current intensity detected.

10. The DC voltage chopper according to claim 9, wherein the overvoltage reference signal is offset from the reference DC voltage by an offset voltage.

11. The DC voltage chopper according to claim 9, wherein the DC voltage chopper performs hysteretic regulation only in a discontinuous current mode, and works as a current mode regulator in a continuous current mode.

12. The DC voltage chopper according to claim 1, wherein said logic circuit blocks a switch-on operation when said comparison circuit detects a signal that is larger than a switch-on threshold at said output terminal of the DC voltage chopper.

13. The DC voltage chopper according to claim 1, wherein said logic circuit has a timing element for leaving said power switch device on for a short time regardless of whether said logic circuit has received the switch-off signal.

14. The DC voltage chopper according to claim 3, wherein the ramp signal forms a progressively sloping ramp.

15. The DC voltage chopper according to claim 2, further comprising:
   an error amplifier circuit for analyzing the output voltage, said error amplifier having a first input connected to said reference voltage generator and receiving the reference voltage, a second input connected to said output terminal, and a circuit output outputting an error amplifier signal; and
   a further comparison circuit exhibiting hysteretic behavior and having a first input terminal connected to said circuit output and receiving the error amplifier signal, and a second input terminal receiving an further reference voltage, said further comparison circuit outputting an output signal supplied to said OR gate of said logic circuit as an additional switch-off signal.

16. The DC voltage chopper according to claim 15, wherein the error amplifier signal is offset from the further reference signal by an offset voltage.

17. The DC voltage chopper according to claim 15, wherein the DC voltage chopper performs hysteretic regulation only in a discontinuous current mode, and works as a current mode regulator in a continuous current mode.

18. A DC voltage chopper, comprising:
   a power switch device having a drive circuit and a main circuit connected to and driven by said drive circuit;
   an LC filter circuit connected to said main circuit, said LC filter circuit having an output terminal functioning as an output terminal of the DC voltage chopper;
   a commutating circuit connected in parallel to said LC filter circuit;
   a reference voltage generator outputting a reference voltage;
   a comparison circuit having a hysteretic function and an output connected to said drive circuit, said comparison circuit having a first input terminal connected to said output terminal, and a second input terminal connected to said reference voltage generator and receiving the reference voltage; and
   a current detecting circuit for detecting a maximum current intensity flowing through said power switch device and connected to said main circuit;
   said drive circuit having a logic circuit with a first input connected to said output of said comparison circuit for receiving a switch-off signal for said power switch device, and a second input for receiving a switch-on signal for said power switch device, said second input receiving a trigger clock signal with a fixed frequency as the switch-on signal, said logic circuit generating an output signal for switching said power switch device on always after a constant period of time determined by the fixed frequency of the trigger clock signal, said logic circuit switching said power switch device off as soon as the output voltage of the DC voltage chopper reaches the reference voltage;
   said logic circuit having an OR gate for OR-linking switch-off signals derived from the output voltage and from the maximum current intensity detected.

* * * * *